Figure 4:
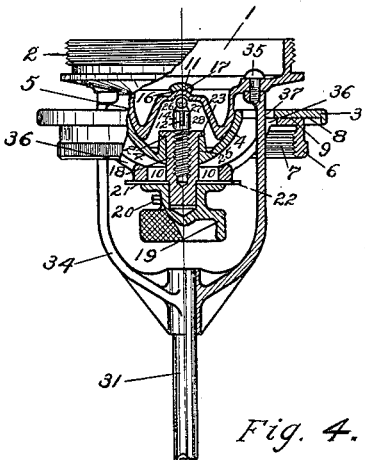

L. F. HELLMANN.
AUTOMATIC LEVELING ATTACHMENT FOR SURVEYING INSTRUMENTS, &c.
APPLICATION FILED NOV. 10, 1914.
1,144,594.
Patented June 29, 1915.
2 SHEETS—SHEET 1.
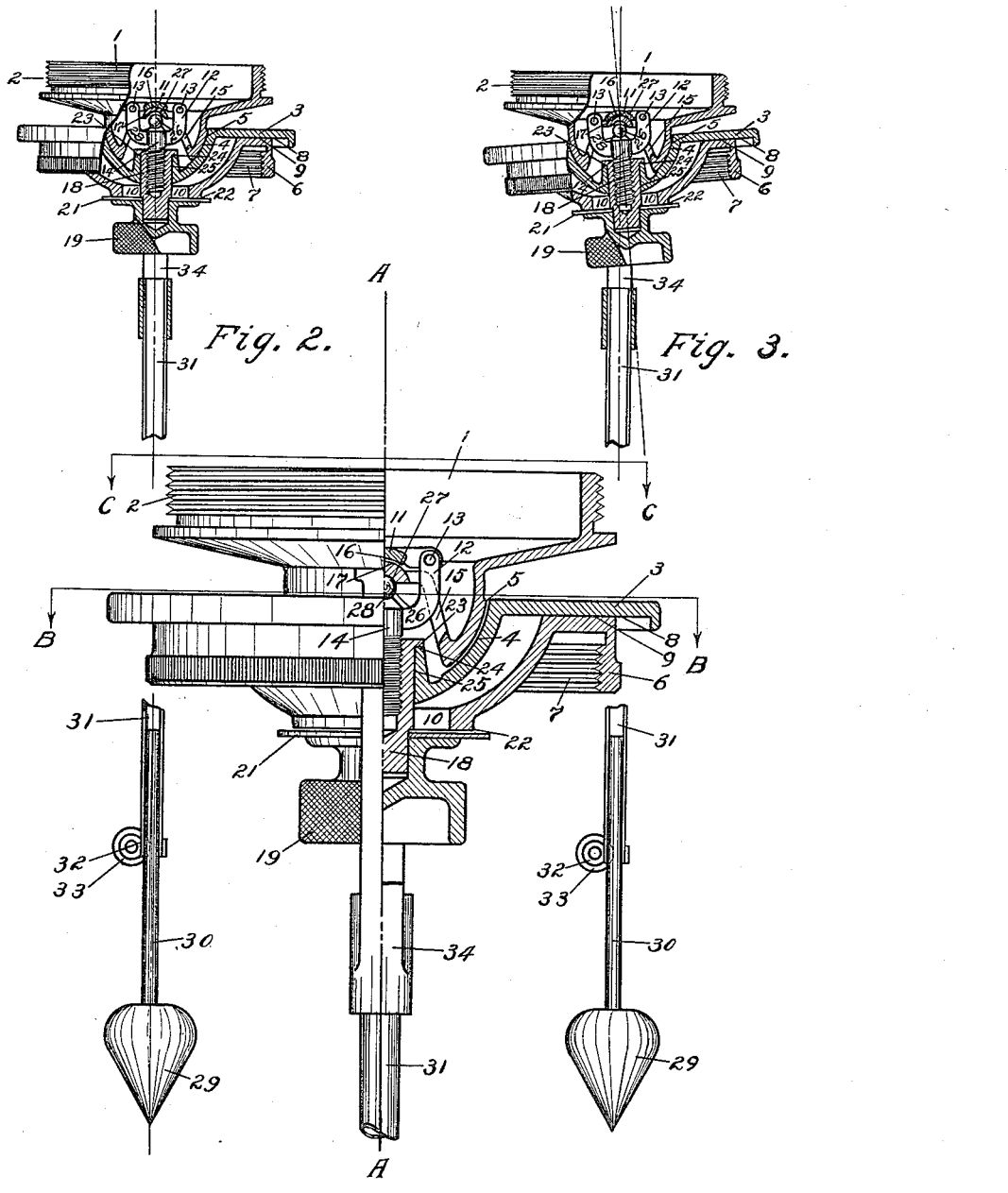

L. F. HELLMANN.
AUTOMATIC LEVELING ATTACHMENT FOR SURVEYING INSTRUMENTS, &c.
APPLICATION FILED NOV. 10, 1914.

1,144,594.

Patented June 29, 1915.
2 SHEETS—SHEET 2.

WITNESSES:

INVENTOR
Lui F. Hellmann.

UNITED STATES PATENT OFFICE.

LUI F. HELLMANN, OF INDIANAPOLIS, INDIANA.

AUTOMATIC LEVELING ATTACHMENT FOR SURVEYING INSTRUMENTS, &c.

1,144,594.  Specification of Letters Patent.  Patented June 29, 1915.

Application filed November 10, 1914. Serial No. 871,415.

*To all whom it may concern:*

Be it known that I, LUI F. HELLMANN, a citizen of the United States, residing at Indianapolis, county of Marion, and State of Indiana, have invented a certain new and useful automatic leveling attachment for surveying instruments to be used on and in connection with general surveying instruments or instruments or apparatus of a similar character, but most especially such instruments of surveying as are commonly known as the transit or the level, of which the following is the specification.

My invention relates, more especially, to those instruments of surveying which are more commonly known as the level and the transit, but it may also be used by all or any such instruments or apparatus, which must be brought to level or to a certain predetermined angle with a line which passes from any point on the earth's surface to its center, the aforesaid point being the point at which such instrument or apparatus is located.

The object of my invention is to produce an attachment for the aforenamed instruments or apparatus which will, by automatic means, and with a minimum amount of time and labor, bring such instrument or apparatus to level or to a certain predetermined angle with a line passing from the point on the earth's surface at which the instrument or apparatus sets, to the earth's center.

A further object of my invention is to produce an attachment, of the nature and for the uses above set forth, whereby a means will be provided for shifting, in a horizontal plane, the entire instrument, or apparatus, such shifting as has been found necessary in instruments or apparatus of the class, to which the instrument, most commonly known as the transit, belongs.

A further object of my invention is to produce a means for rigidly and securely tightening and holding in place such instrument or apparatus, after such instrument or apparatus shall have adjusted itself, or have been adjusted, to the certain predetermined position.

A further object of my invention is to produce an attachment for the uses and purposes above set forth and in addition thereto, to have a means for adjusting the weight in a vertical direction so that the instrument may be accurately centered.

Other objects will appear hereinafter.

With these objects in view, my invention consists, generally, of a ball screw plate upon which the instrument, or apparatus, with which this attachment is to be used, screws or fits; a ball socket shifting plate, into whose ball socket, the ball part of the ball screw plate is fitted, and which permits a certain degree of rotation for said ball screw plate; a head cap, which screws or fits on the tripod or other means for holding the instrument, and which permits a certain amount of shifting of the ball socket shifting plate; a clamp, with its necessary tie rods and clamp screw, by which the attachment with its attached instrument, or apparatus, is loosened or tightened; a nut and thumb nut by means of which the tightening screw and clamp is operated; and a hanging weight which with its necessary rods, tubes and weight hangers is rigidly fastened to the ball screw plate, and which by the action of gravity causes the ball screw plate to come to a certain predetermined level or angle with the above mentioned line when the instrument is properly loosened.

My invention further consists in various details of construction and arrangement of parts all as will be fully described hereinafter and particularly pointed out in my claims.

My invention will be more readily understood by reference to the accompanying drawings which form a part of the specification and in which—

Figure 5:
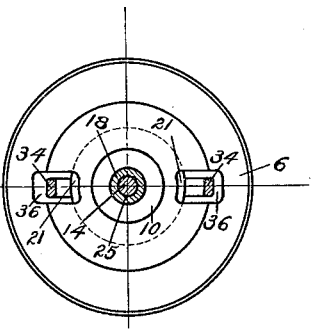
Figure 7:
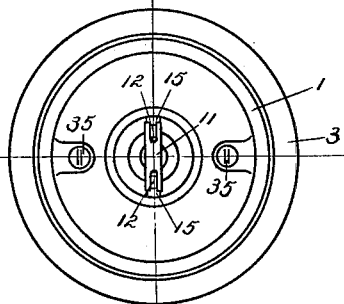
Figure 6:
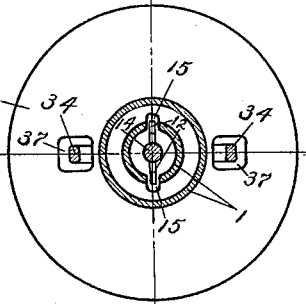

Figure 1 is a vertical section through the attachment proper, in normal position, showing said attachment in a loosened position; the entire instrument and attachment resting upon and being supported by a single point or ball in the center. Fig. 2 shows a similar section but of the instrument together with the weights, and showing the instrument in a tightened, normal position. Fig. 3 shows identically the same section as Fig. 2, the only difference being that Fig. 3 shows the attachment in a tilted or angular position instead of normal as shown in Fig. 2. Fig. 4 shows a section of the attachment along the line "*a a*" Fig. 1 showing the weight hangers in detail. Fig. 5 is a section of the attachment taken along the upper surface of the head cap when all parts which are above the head cap are removed. Fig. 6 is a section of the attachment along the line "b b" Fig. 1. Fig. 7 is an end view of the attachment looking into the top, as is indicated by the line "c c" Fig. 1.

Again referring to the drawings 1 indicates the ball screw plate upon whose threads 2 the instrument or apparatus screws. Said instrument or apparatus may be fastened to the ball screw plate 1 by any other suitable means, other than screw threads 2, without affecting the invention.

3 indicates the ball socket shifting plate, into whose ball socket 4, the ball part 5 of the ball screw plate is fitted.

6 indicates the head cap whose threads 7 screw upon the tripod or other means of holding the instrument or apparatus. The fastening of the attachment of the tripod, or other means of holding, may be made by any other suitable means, besides the threads, without affecting the invention. The horizontal flat surface 8 of the ball socket shifting plate 3 is free to slide, when the instrument is loosened, upon the horizontal flat surface 9 of the head cap 6, the amount of this shift being limited only by the respective sizes of the horizontal flat surfaces 8 and 9 and by the diameter of the hole 10 in the lower part of the head cap 6.

11 indicates the clamp which is fastened to the tie rods 12 by means of the pins or bolts 13, tie rods 12 being part of or securely fastened into the clamp screw 14, the tie rods passing from the underneath side of the ball screw plate 1 to the clamp 11 through the openings 15 in the ball screw plate 1.

16 indicates the ball socket clamping surface of the clamp 11, which is fitted to the ball clamping surface 17 of the ball screw plate 1.

18 indicates the screw nut by means of which the clamp screw 14 is raised or lowered.

19 indicates the thumb nut which is securely fastened to the screw nut 18 by means of the set screw 20 or by any other suitable rigid and secure means.

21 indicates a washer between the thumb nut 19 and the thrust surface 22 of the head cap 6.

23 indicates the thrust bearing surface of the screw nut 18 which bears against the thrust bearing surface 24 of the ball socket shifting plate 3 when the attachment is in a loosened, or raised position.

25 indicates the bearing surface between the screw nut 18 and the ball socket shifting plate 3.

26 indicates the ball bearing, which fits into the ball socket 27 of the ball screw plate 1, on one side and the ball socket 28 of the clamp screw 14 on the other. This ball may be eliminated and the clamp screw 14 may be brought to a point or rounded to perform the same function.

29 indicates the weight. This weight preferably consists of a hollow shell partially filled with mercury, but may consist of a solid weight, or any other suitable weight.

30 indicates the weight rod, which is securely fastened to the weight 29 by any suitable rigid and secure means. The weight rod 30 is free to slide, up and down, to secure proper adjustment in the weight tube 31, which is split for a short distance from the lower end, and to which weight tube 31, it is securely held in place, after adjustment has been secured, by means of the adjusting clamp 32 and adjusting clamp screw 33. Any other suitable means may be employed to fasten the weight rod 30 to the weight tube 31.

34 indicates the weight hangers, which are securely and rigidly fastened to the ball screw plate 1 by means of the screws or bolts 35 or by any other suitable means.

The weight tube 31 is securely and rigidly fastened into the weight hangers 34 by any suitable means, for instance, as being soldered together, or they may be in one piece.

The weight hangers 34 pass from the lower side of the instrument to the ball screw plate 1 through the openings 36 in the head cap 6 and the openings 37 in the ball socket shifting plate 3.

The operation of the attachment is as follows: The head cap 6 is screwed or fastened upon the tripod or other means of holding the instrument or apparatus by means of the threads 7, or by any such other means of fastening as may be found necessary and convenient. The instrument or apparatus proper is now screwed or fastened upon the ball screw plate 1 by means of the threads 2 or by any such other means of fastening as may be found necessary and convenient. The entire instrument is now properly set up at the point of operations. The operator now takes hold of and turns, the thumb nut 19, in the proper direction for loosening the attachment. As the operator turns this thumb nut 19 in the proper direction, this in turn revolves the screw nut 18, in the bearing surface 25, which by doing so raises the clamp screw 14. The clamp screw 14 can not revolve, since the tie rods 12 pass through openings 15 in the ball screw plate 1, and this plate in turn is prevented from revolving by the weight hangers 34 passing through the openings 36 in the head cap 6. As the clamp screw 14 is raised its first operation is to bring the thrust bearing surface 23 of the screw nut 18 to bear against the thrust bearings surface 24 of the ball socket shifting plate 3. As the clamp screw 14 is further raised it separates the ball socket clamping surface 16 of the clamp 11 from the ball clamping surface 17 of the ball screw plate 1. As the clamp screw 14 is further raised the ball bearing 26 engages in the ball socket 27 of the ball screw plate 1. As the clamp screw 14 is still further raised the pressure of the ball bearing 26 on the ball socket 27 of the ball screw plate 1 raises the ball screw plate 1, together with the entire instrument, or apparatus, attached thereon and the ball part 5 of the screw ball plate 1 is now disengaged and released from the ball socket 4 of the ball socket shifting plate 3. The entire instrument, or apparatus, together with the ball screw plate 1 is now pivoted upon the bearing 26 and is entirely free to revolve through a certain predetermined angle about the center of this ball bearing 26. Now, whereas the force tending to rotate the instrument, or apparatus, about the center of the ball bearing 26, produced by the weight 29, is much greater than that produced by the instrument, or apparatus, due to the fact that the distance from the center of the ball bearing 26, to the center of the weight 29, is much greater than the distance, from the center of the ball bearing 26, to the center of the instrument, or apparatus, and since surveying instruments are mostly, nearly balanced, the weight 29 by virtue of the forces of gravity will seek a point on a line passing from the center of the ball bearing 26 to the center of the earth, and consequently the center line passing through the weight 29, the weight rod 30, the weight tube 31 and the ball bearing 26 will be on the line passing from that point, at which the instrument stands, to the center of the earth. When the instrument, or apparatus, has been properly loosened, as above described, and the axis of the weight 29 through the forces of gravity, as above described, has brought the center line to coincide with the line from the earth's center to the point at which the instrument, or apparatus, sets, the ball screw plate 1 together with its attached instrument or apparatus will be level, or at a certain predetermined angle with the line passing from the point at which the instrument, or apparatus, stands, to the center of the earth. When this condition has been obtained, the operator turns the thumb nut 19 in the proper direction to tighten the attachment. Turning the thumb nut 19 will cause the screw nut 18 to revolve in the bearing surface 25 between the screw nut 18 and the ball socket shifting plate 3. This causes the clamp screw 14 to be lowered and an operation, directly opposite the loosening operation previously described, takes place. As the clamp screw 14 is lowered the first operation is to lower the ball part 5, of the screw ball plate 1, into the ball socket 4, of the ball socket shifting plate 3, thereby preventing the instrument, or apparatus, from further movement angularly. As the clamp screw 14 is further lowered the ball bearing 26 is disengaged and lowered from the ball socket 27, of the ball screw plate 1. As the clamp screw 14 is still further lowered the ball socket clamping surface 16, of the clamp 11, is lowered and engages upon the ball clamping surface 17, of the ball screw plate 1. As the operator continues to turn the thumb nut 19, in the tightening direction, after the clamp 11 has engaged the ball screw plate 1, the thumb nut 19, the washer 21, and the screw nut 18 are raised until the washer 19 firmly and rigidly engages upon the thrust surface 22 of the head cap 6 it being understood that the thumb nut 19 is firmly, and rigidly, engaged against the washer 21, thus firmly, and rigidly, locking the entire attachment and instrument, or apparatus, in position. The instrument, or apparatus, is now ready to continue work.

The horizontal shifting of the instrument is accomplished as follows:—It is noted, that when the attachment is in a locked or clamped position, that the thumb nut 19 is firmly and rigidly engaged against the washer 21, which in turn is firmly and rigidly engaged against the thrust surface 22 of the head cap 6. This produces a rigidly clamped position between the thrust surface 22 of the head cap 6 and the ball clamping surface 17 of the ball screw plate 1. This in its turn produces a pressure, and consequently a clamped position, between the horizontal flat surface 8, of the ball socket shifting plate 3, and the horizontal flat surface 9, of the head cap 6. When the attachment is in a loosened position, the only pressure existing between the horizontal flat surface 8, of the ball socket shifting plate, and the horizontal flat surface 9, of the head cap 6, is the friction due to the weight of the ball screw plate 1, and its attached instrument, or apparatus, which can be neglected. Thus, when the attachment is in a loosened position, the ball socket shifting plate 3 can be shifted upon the head cap 6 into any desired position, within the predetermined limits. The attachment is then firmly and rigidly tightened and clamped as hereinbefore explained.

The adjusting of the weight in a vertical direction is accomplished as follows: The weight rod 30 being of the same external diameter, as the internal diameter of weight tube 31, it is free to slide up and down in said weight tube 31. The operator loosens the adjusting clamp screw 33, moves the weight 29, with its weight rod 30, up, or down, to secure the proper adjustment, he then tightens the adjusting clamp screw 33, and the attachment is ready for use.

In certain classes of instruments, or apparatus, to which class the instrument most commonly known as the level belongs, the shifting plate feature of this invention is entirely valueless, and, for the purpose of securing a least expensive construction, it is possible to unite the ball socket shifting plate 3 and the head cap 6 into one unit piece, without affecting the value of the attachment in general.

In certain classes of instruments, or apparatus, to which class the instrument, most commonly known as the level, belongs, the vertical adjustment for the weight 29 is valueless, and for the purpose of securing a least expensive construction it is possible to unite the weight rod 30 and the weight tube 31 into one unit rod or tube, thus eliminating the adjusting clamp 32 and the adjusting clamp screw 33, without affecting the value of the attachment in general.

Having described my invention, what I claim as new and desire to secure by Letters Patent is:—

1. An automatic leveling attachment, consisting of a ball screw plate upon which the instrument is fastened, the radius of the ball part of the ball screw plate being taken from the center of the ball, a ball socket plate with substantially the same radius as the first mentioned plate, said ball socket plate being secured by means of a cap piece to the top of the tripod, a clamp for securing the ball screw plate to the ball socket plate, a means for raising and lowering the clamp, a pendulum weight secured to the ball screw plate for leveling the same, a bearing upon which the ball screw plate and pendulum weight are raised and pivoted, a means for raising and lowering the said bearing, substantially as described.

2. An automatic leveling attachment, consisting of a ball screw plate upon which the instrument is fastened, the radius of the ball part of the ball screw plate being taken from the center of the ball, a ball socket plate with substantially the same radius as the first mentioned plate, said ball socket plate being secured by means of a cap piece to the top of the tripod, a clamp for securing the ball screw plate to the ball socket plate, a means for raising and lowering the clamp, a pendulum weight secured to the ball screw plate for leveling the same, a means for shortening or lengthening the means, by which the pendulum weight is attached to the ball screw plate, a means for securing the pendulum weight in its adjusted position, a bearing upon which the ball screw plate and pendulum weight are raised and pivoted, a means for raising and lowering the said bearing, substantially as described.

3. An automatic leveling attachment, consisting of a ball screw plate upon which the instrument is fastened, the radius of the ball part being struck from the center of the ball, a ball socket shifting plate with substantially the same radius as the first mentioned plate, said ball socket plate resting upon and being movable in a horizontal direction upon a head cap, said head cap being secured by means of a cap piece to the top of the tripod, a clamp for securely fastening the ball screw plate, the ball socket shifting plate, and the head cap together, a means for raising and lowering the clamp, a pendulum weight secured to the ball screw plate for leveling the same, a bearing upon which the ball screw plate and pendulum weight are raised and pivoted, a means for raising and lowering the said bearing, substantially as described.

4. An automatic leveling attachment consisting of a ball screw plate upon which the instrument is fastened, the radius of the ball part being struck from the center of the ball, a ball socket shifting plate with substantially the same radius as the first mentioned plate, said ball socket plate resting upon and being movable in a horizontal direction upon a head cap, said head cap being secured by means of a cap piece to the top of the tripod, a clamp for securely fastening the ball screw plate, the ball socket shifting plate, and the head cap together, a means for raising and lowering the clamp, a pendulum weight secured to the ball screw plate for leveling the same, a means for shortening or lengthening the means by which the pendulum weight is attached to the ball screw plate, a means for securing the pendulum weight in its adjusted position, a bearing upon which the ball screw plate and pendulum weight are raised and pivoted, a means for raising and lowering the said bearing, substantially as described.

In testimony whereof I have signed my name to this specification in the presence of two subscribing witnesses.

LUI F. HELLMANN.

Witnesses:
E. B. GEORGE,
W. A. BLACK.